June 4, 1946. J. L. WOODBRIDGE 2,401,448
FILLING AND VENTING STRUCTURE FOR STORAGE BATTERIES
Filed Sept. 16, 1943

WITNESS:

INVENTOR
Joseph Lester Woodbridge
BY
Augustus B. Stoughton
ATTORNEY.

Patented June 4, 1946

2,401,448

UNITED STATES PATENT OFFICE 2,401,448

FILLING AND VENTING STRUCTURE FOR STORAGE BATTERIES

Joseph Lester Woodbridge, Philadelphia, Pa., assignor to The Electric Storage Battery Company, a corporation of New Jersey Application September 16, 1943, Serial No. 502,568

12 Claims. (Cl. 136—177)

This invention relates to filling and venting structures for storage battery cells, and more particularly to such structures adapted to prevent overfilling by providing a filling duct extending through the cell cover to the desired maximum electrolyte level to trap gas during the filling operation in the space under the cover surrounding the walls of the filling duct, thus causing the liquid to rise in the duct to become visible to the operator, with means for venting said trapped gas thereafter.

An object of this invention is to provide an improved filling structure which will produce the results above outlined without the use of valves or moving parts or any loose parts which may be removed or misplaced.

Another object of the invention is to provide a simple, rugged and relatively inexpensive filling structure which may be readily molded or otherwise manufactured at minimum cost and with simple and inexpensive tool equipment.

Further objects of this invention will appear as the following description proceeds and the features of novelty which characterize this invention will be set forth in the accompanying claims.

Generally stated this invention comprises a filling duct extending through the cell cover down to the desired maximum electrolyte level, with a vent passage passing through the wall of the duct. The vent passage terminates at one end just under the cover in the space for trapped gas and at the other end under the surface of liquid retained in a cavity preferably located in the filling duct in the path of the liquid being introduced into the cell. The filling of said cavity with liquid retards the venting of gas trapped under the cover and causes the liquid to rise in the filling duct to give an indication that the cell is sufficiently filled.

This invention will be more clearly understood by reference to the following description and the accompanying drawing in which.

Figure 1:
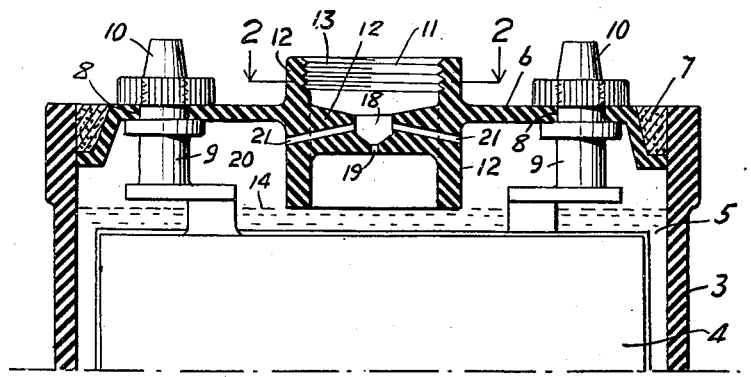
Figure 1 is a partial sectional elevation taken longitudinally through a storage battery cell and cover therefor showing the filling and venting structure of the invention.
Figure 4:
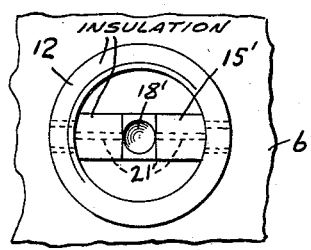
Figure 4 is a top plan view of the structure of Figure 3.

Referring to Figure 1, 3 indicates the walls of a battery jar containing the usual plate assembly 4 and electrolyte 5. The battery is provided with the usual cover 6 held in place by sealing compound 7 and perforated at 8 to accommodate the passage of the lugs 9 through the cover to the terminal posts or connectors 10. Provided in the cover is a filling duct 11 defined by a cylindrical wall 12 internally threaded at the top as at 13 to receive a vent plug (not shown) and extending down to the desired maximum electrolyte level 14. Disposed across the filling duct a short distance below the top is the vent control member 15 defined by parallel vertical wall surfaces 16 (Figure 2) leaving spaces 17 on either side for the introduction of water to the cell and for the insertion of a hydrometer syringe.

At the mid point of the upper surface of the vent control member 15 is formed a well or cavity 18 which may be provided at the bottom with a restricted drain 19, which, while desirable, may not in all cases be necessary.

Extending from points near the bottom of the well 18 through member 15 and through the wall 12 to points just below the under side of the cover 10 are the downwardly sloping restricted vent passages 21.

The foregoing structure constitutes one form of improved non-overfill device of this invention and its operation is as follows:

When water is added to the cell through the filling duct 11, the well 18 will be filled thus substantially closing or sealing by a liquid seal the vent passages 21. When the electrolyte in the cell reaches the level 14, gas will be trapped in the spaces 20 under the cover which inhibits further flow of liquid into the cell thereby causing liquid to rise in the filling duct 11 to indicate the completion of the filling operation. Upon termination of the filling operation the trapped gas will bubble slowly through the liquid in the well 18 until the back pressure is relieved and the level in the filling duct subsides. The liquid in the well 18 will eventually drain off through the drain 19 if present, or through the vent passages 21, leaving the latter free for venting the gases developed during normal operation of the cell.

Figure 2:
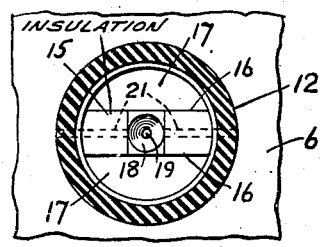
Figure 2 is a sectional view of the filling and venting structure taken on the line 2—2 of Figure 1.
Figure 3:
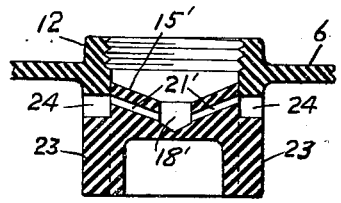
Figure 3 is a partial sectional view through a cell cover showing a modified form of this invention.
Figure 6:
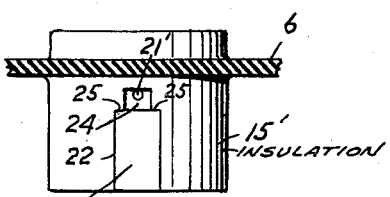
Figure 6 is a side elevation of the outer wall of the filling duct of the structure of Figure 3 showing the slot.
Figure 5:
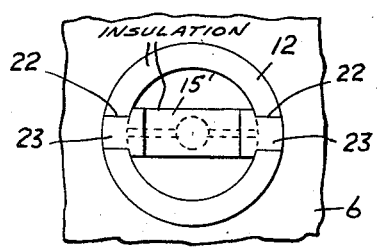
Figure 5 is a bottom plan view of the structure of Figure 3.
Figure 7:
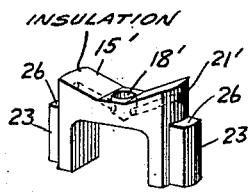
Figure 7 is a perspective view of the vent control member of the structure of Figure 3.

It is to be observed that the control member 15 shown in Figures 1 and 2, including the well 18 and drain 19 may be molded in one piece integral with the filling well and the cover. The vent passages 21 may thereafter be provided by a simple drilling operation.

In Figures 3 to 7 is shown a modification of the structure of Figures 1 and 2, which may be easily fabricated and assembled. Common elements have been given like reference numerals. In this modification the vent control member 15' is separately molded. Through the side walls 12 of the filling duct are formed vertical slots 22 into which are fitted the lateral tongues 23 projecting from the ends of the vent control member 15'. The slots 22 are provided with narrower portions 24 at the top thereof which produce downwardly facing shoulders 25 against which the upper faces 26 of the tongues 23 abut, thus leaving the narrow portions 24 of the slots unobstructed.

As in the case of the structure shown in Figure 1, there is formed in the upper surface of the vent control member 15' a well 18' from which extend the restricted vent passages 21'. These vent passages extend upwardly and outwardly and terminate in the open spaces 24 through which they communicate with the space 20 for trapped gas under the cover. The restricted drain 19 shown in Figures 1 and 2 has been omitted in the modification of Figure 3 but, if desired, it could be here provided also. The vent control member is secured in place by cementing or by any other suitable means to provide a tightly sealed junction between the tongues 23 and the vertical surfaces of the slots 22.

By making the vent control member as a separate piece the vent passages 21' may be conveniently drilled at an angle downwardly directed into the well 18'. With this construction and by omitting the drain at the bottom of the well liquid will always be retained in the well, thus assuring the retardation of the venting of the trapped gas in case the liquid supplied during the filling operation should inadvertently be directed at one side of the vent control member and miss the well.

From the foregoing detailed description it will be seen that there is provided in accordance with this invention a device for preventing overfilling of a storage battery cell which requires no moving parts or interengagement of parts and is therefore free from the difficulties occasioned by such elements. Moreover the structure of this invention is simple, rugged and relatively inexpensive to produce.

While a specific embodiment of this invention and a modification thereof have been illustrated and described, other modifications thereof will be apparent to those skilled in the art. It is not, therefore, desired to limit this invention to the particular constructions shown and described, and it is intended in the appended claims to cover all modifications within the spirit and scope of my invention.

I claim:

1. In a filling and venting structure for a storage battery cell containing electrolyte and having a cover and a gas space under said cover above the normal electrolyte level, the combination of a filling duct through said cover defined by a single wall extending down to the normal electrolyte level, an elongated tubular vent passageway extending between the space under said cover and the interior of said filling duct and means for sealing said vent passageway by a fluid seal during a filling operation comprising an upwardly facing cavity forming a portion of said vent passageway and positioned within said filling well so as to be filled during a filling operation and a restricted drain passage independent of said vent passageway for slowly draining said cavity upon the termination of said filling operation.

2. In a filling and venting structure for a storage battery cell containing electrolyte and having a cover and a gas space under said cover above the normal electrolyte level, the combination of a filling duct through said cover defined by a single wall extending down to the normal electrolyte level, a vent control member extending across said filling duct and only partially closing said duct, a cavity in the upper surface of said member adapted to receive a portion of the filling liquid and an elongated tubular restricted vent passageway communicating with said cavity and the space under said cover above said normal electrolyte level.

3. In a filling and venting structure for a storage battery cell containing electrolyte and having a cover and a gas space under said cover above the normal electrolyte level, the combination of a filling duct through said cover defined by a single wall extending down to the normal electrolyte level, an elongated tubular vent passageway extending between the space under said cover and the filling duct, a vent control member in said filling duct but spaced from portions of the walls thereof to leave an opening for filling liquid, a cavity in the upper surface of said member forming a part of said vent passageway and adapted to receive a portion of said filling liquid whereby said vent passageway is sealed by a liquid seal when said cavity is filled with filling liquid and a restricted drain for said cavity independent of said vent passageway for unsealing said vent passageway when the filling operation is terminated.

4. In a filling and venting structure for a storage battery cell containing electrolyte and having a cover and a gas space under said cover above the normal electrolyte level, the combination of a filling duct through said cover defined by a single wall extending down to the normal electrolyte level, a vent control member in said duct and having an area less than the cross-sectional area of the filling duct so that filling openings are provided between the control member and the walls of said duct, a cavity in the upper surface of said control member and adapted to receive a portion of the filling liquid during a filling operation, an elongated tubular vent passageway communicating with the space under said cover and with said cavity whereby during a filling operation the liquid received in said cavity seals said vent passageway to cause the trapping of gas in said space under said cover, and means independent of said vent passageway for draining said cavity upon the termination of said filling operation.

5. In a filling and venting structure for a storage battery cell containing electrolyte and having a cover and a gas space under said cover above the normal electrolyte level, the combination of a filling duct through said cover defined by a single wall extending down to the normal electrolyte level, a vent control member integral with said filling duct extending across said duct between the walls thereof but only partially obstructing said duct, a cavity in the upper surface of said member adapted to receive liquid, and an elongated tubular restricted vent passage extending from said cavity outwardly and downwardly through said member and said wall and opening into the space under said cover.

6. In a filling and venting structure for a storage battery cell containing electrolyte and having a cover and a gas space under said cover above the normal electrolyte level, the combination of a filling duct through said cover defined by a single wall extending down to the normal electrolyte level, a vent control member extending across the duct between the walls thereof but spaced from a portion of said walls to provide openings for filling fluid, a cavity in the upper surface of said member adapted to receive liquid, and an elongated tubular restricted vent passageway extending from said cavity outwardly and upwardly through said member and said wall and opening into the gas trapping space.

7. In a filling and venting structure for a storage battery, a cover, a tubular member within said cover defining a filling well the lower end of which terminates in the desired electrolyte level, an elongated tubular vent passageway in said tubular member communicating at one end with the space under said cover above said desired electrolyte level and at its opposite end with the interior of said filling well and means for sealing said vent passageway during a filling operation comprising a member extending across said filling well through which said vent passageway extends, an upwardly facing cavity in said last mentioned member in which one end of said vent passageway terminates so that said cavity forms a portion of said vent passageway, said cavity lying in the path of liquid passing through said filling well so as to be filled thereby, whereupon during a filling operation the flow of gas through said vent passageway from said space under said cover is opposed and gas is trapped in said space when the electrolyte reaches the desired level.

8. In a filling and venting structure for a storage battery, a cover, a tubular member within said cover defining a filling well the lower end of which terminates in the desired electrolyte level, an elongated tubular vent passageway in said tubular member communicating at one end with the space under said cover above said desired electrolyte level and at its opposite end with the interior of said filling well and means for closing said opposite end of said vent passageway by a liquid seal formed during a filling operation said means comprising a member projecting into said filling well and lying in the path of liquid flowing through said filling well, and an upwardly facing cavity in said last mentioned member in which said opposite end of said vent passageway terminates, said cavity being adapted to receive liquid during a filling operation so as to cover said opposite end of said vent passageway by a liquid seal.

9. In a filling and venting structure for a storage battery cell containing electrolyte and having a cover and a gas space under said cover above the normal electrolyte level and having a filling duct through said cover defined by walls extending down to the normal electrolyte level, the combination of an opening through said walls between the duct and the gas space, a vent control member inserted into and sealing said opening and having a portion projecting into said duct, a cavity in the upper surface of said projecting portion and an elongated tubular vent passageway passing through said vent control member and communicating at one end with the cavity and at the opposite end with the gas space under the cover.

10. In a filling and venting structure for a storage battery cell containing electrolyte and having a cover and a gas space under said cover above the normal electrolyte level and having a filling duct through said cover defined by walls extending down to the normal electrolyte level, the combination of two diametrically opposite longitudinal slots through said walls and extending to the lower edge thereof, a vent control member supported athwart said filling duct by projections inserted in and sealing said slots, a cavity in the upper surface of said vent control member and a vent passageway passing through said vent control member and communicating at one end with the cavity and at the opposite end with the gas space under the cover.

11. A storage battery cover provided with a single open ended tube depending to the normal level of the electrolyte and having a bridge member extending crosswise of the opening in the tube, leaving space at the side for the passage of fluid, said bridge member constructed with an upwardly facing cavity, there being provided in the wall of said elements a vent passage therethrough and defined by an imperforate bounding wall and extending from and opening into the cavity and the interior of the cell.

12. In a filling and venting structure for a storage battery cell containing electrolyte and having a cover and a gas space under said cover above the normal electrolyte level and having a filling duct through said cover defined by walls extending down to the normal electrolyte level, the combination of a member in said filling duct adjacent its upper end, an upwardly facing cavity in said member located in the path of liquid flowing through said duct and adapted to retain a portion of said liquid and a restricted vent passageway terminating at one end in the gas space around the duct above the normal electrolyte level and at the other end adjacent the bottom of the cavity wholly below the rim of said cavity whereby all trapped gas escaping from the gas space is forced to bubble through the liquid in the cavity.

J. LESTER WOODBRIDGE.